US00RE35506E

United States Patent [19]

Solazzi et al.

[11] E Patent Number: Re. 35,506

[45] Reissued Date of Patent: May 13, 1997

[54] POWDER COMPACTING PRESS APPARATUS AND METHODS

[75] Inventors: Michael C. Solazzi, Hillsdale, N.J.; Monte J. Solazzi, Jupiter, Fla.

[73] Assignee: Chemplex Industries, Inc., Tuckahoe, N.Y.

[21] Appl. No.: 452,601

[22] Filed: May 10, 1995

Related U.S. Patent Documents

Reissue of:

[64] Patent No.: 5,202,067
Issued: Apr. 13, 1993
Appl. No.: 790,344
Filed: Nov. 12, 1991

U.S. Applications:

[63] Continuation of Ser. No. 103,859, Aug. 9, 1993, abandoned.

[51] Int. Cl.[6] ..... B29C 43/02

[52] U.S. Cl. ..... 264/40.5; 264/102; 264/109; 425/149

[58] Field of Search ..... 264/40.5, 102, 264/109; 425/78, 149, 150, 405.1, 406, 412, 420

[56] References Cited

U.S. PATENT DOCUMENTS

| | | | |
|---|---|---|---|
| 2,110,972 | 3/1938 | Dinzl | 425/149 |
| 2,384,163 | 9/1945 | Flowers | 425/149 |
| 4,413,967 | 11/1983 | Burry | 425/149 |
| 4,863,651 | 9/1989 | Koten | 264/40.5 |
| 4,946,634 | 8/1990 | Shaner | 264/40.5 |
| 5,039,294 | 8/1991 | Gautier et al. | 425/149 |
| 5,043,111 | 8/1991 | Hinzmann et al. | 264/40.5 |
| 5,087,398 | 2/1992 | Le Molaire et al. | 264/40.5 |

*Primary Examiner*—Allan R. Kuhns
*Attorney, Agent, or Firm*—Plevy & Associates

[57] ABSTRACT

A briquette press apparatus for compacting powdered materials having a programmable control monitoring the forces of the press. During compression, the programmable control measures the compression force being asserted against the powdered material and regulates the press so that the compression force equals a programmed reference value. During decompression, the programmable control monitors the pressure release rate of the press and regulates the press so that the measured pressure release rate matches a programmed reference rate.

18 Claims, 6 Drawing Sheets

POWDER COMPACTING PRESS APPARATUS AND METHODS

Matter enclosed in heavy brackets [ ] appears in the original patent but forms no part of this reissue specification; matter printed in italics indicates the additions made by reissue.

*This is a continuation of application Ser. No. 08/103,859, filed on Aug. 9, 1993, now abandoned entitled POWDER COMPACTING PRESS APPARATUS AND METHODS.*

FIELD OF THE INVENTION

The present invention relates to press apparatus and methods for forming uniform briquettes from powdered materials and, in particular, to such presses having a continuously controlled compression and decompression cycle that create briquettes for X-ray spectrochemical analysis.

BACKGROUND OF THE INVENTION

Dies and presses that compact powdered materials into solid briquettes are in widespread use. Such manufacturing techniques are now commonplace and are used to create a wide variety of products from complex metal machine parts to pharmaceutical tablets. A problem of powder compacting in certain technical areas such as for use in X-ray analysis involves creating a uniformly dense briquette. If a powdered material is not properly compacted, the final compacted briquette has areas that vary in density. The uneven density results in a briquette that provides improper readings dependent upon position of the briquette in the analysis equipment. Uneven density also can cause the briquette to break prematurely under stress.

Another similar problem with the manufacture of briquettes, originates from the presses used to compact the powdered materials. Until recently, briquette presses had no operating controls to regulate the force the press applied to the briquette during a compression cycle. The result was a large variation in density from one briquette to another. Eventually, control systems have been developed that measure and regulate the peak pressures applied by a press during a compression cycle. Exemplary embodiments of such control systems are shown in U.S. Pat. Nos. 4,946,634 to Shaner, 4,863,651 to Koten, 4,651,273 to Braitinger et al. and 4,413,967 to Burry. These systems resulted in a greater consistency in the density of briquettes produced from the same press.

Many different types of powdered materials are compacted by briquette presses. All material has some elasticity when compressed. Consequently, when powder material is compressed into a briquette, the briquette often expands when released from the press. The sudden expansion of the briquette may cause the briquette to develop stress cracks and flaws that affect its overall strength and surface integrity. To avoid such expansion stresses, briquette presses must slowly decompress the briquette until it reaches ambient pressure. Since the rate of decompression varies as a function of the compression force, size of the briquette, and composition of the briquette, decompression calculations are difficult to utilize during manufacturing. Since most powder compacted materials are used either to create parts that are not subject to major stresses or are sintered in a second operation, manufacturers ignore the decompression stresses and their effect on the quality of the briquette. Often, to maximize productivity, compacted samples are ejected from the mold as soon as they are formed. Such manufacturing techniques maximize the decompression stresses and are the standard method of manufacturing where the defects caused by decompression stresses can be ignored. However, in such precise applications as X-ray spectrochemical analysis, decompression stresses on a compacted sample can vary both the results and quality of any analysis and cannot be ignored.

To conduct a statistically sound X-ray spectrochemical analysis for a material, many briquettes must be formed and tested. As such, it is desirable to automate the briquette press as much as possible without jeopardizing the quality of the formed briquette. Automating press operations is not a new concept. Examples of briquette presses that embody automated sample loading and ejection features are shown in U.S. Pat. Nos. 2,110,972 to Dinzil and 2,384,163 to Flowers. However, for the production of X-ray spectrochemical analysis, often the precision of the sample to be compacted cannot be efficiently achieved by automated means. Consequently, a custom automated system needs to be developed that automates the press to the highest degree possible, yet allow exact amount of powder material samples to be added by hand.

It is therefore an object of the present invention to create a briquette press, for forming X-ray spectrochemical analysis samples, that has a selectively programmable compression and decompression cycle, to efficiently produce high quality, uniform samples free of decompression stresses and associated methods for forming high quality briquettes.

SUMMARY OF THE INVENTION

The present invention provides a new and improved press apparatus for creating uniform density briquettes from powdered materials. More specifically, the apparatus includes a semi-automated press that operates with a compression stroke and a decompression stroke. The press is controlled by a programmable control means that adjusts the pressure, being applied to the powdered materials, to match a desired reference pressure during the compression stroke. Similarly, during the decompression stroke, the actual rate of decompression is regulated by the programmable control means so that it matches a desired reference rate. The controlled decompression stroke prevents a compressed sample from expanding suddenly after being ejected from the mold. Such sudden expansions an cause stress fractures and other flaws in the final form. The programmable control means can be programmed with the desired reference standards for a large variety of different powdered samples; thus the need for complex calculations is eliminated and the set-up time for running the press apparatus is reduced to a minimum.

The apparatus may also be equipped with a means for evacuating air or gas from the powdered material as it is being compressed. This produces a high density compacted form that is less likely to be flawed. The press apparatus also may incorporate automated features for loading and ejecting samples. Consequently, the down time of the apparatus is greatly decreased between cycles.

BRIEF DESCRIPTION OF THE FIGURES

For a better understanding of the present invention, reference is made to the following description of an exemplary embodiment thereof, considered in conjunction with the accompanying drawings in which.

DETAILED DESCRIPTION OF THE FIGURES

Although the present invention can be used in compacting many powdered materials for sintering, pharmaceutical tablets and the like, it is especially suitable for use in briquetting powdered substances for X-ray spectrochemical analysis. Accordingly, the present invention will be described in connection with forming briquettes for X-ray spectrochemical analysis.

Figure 1:
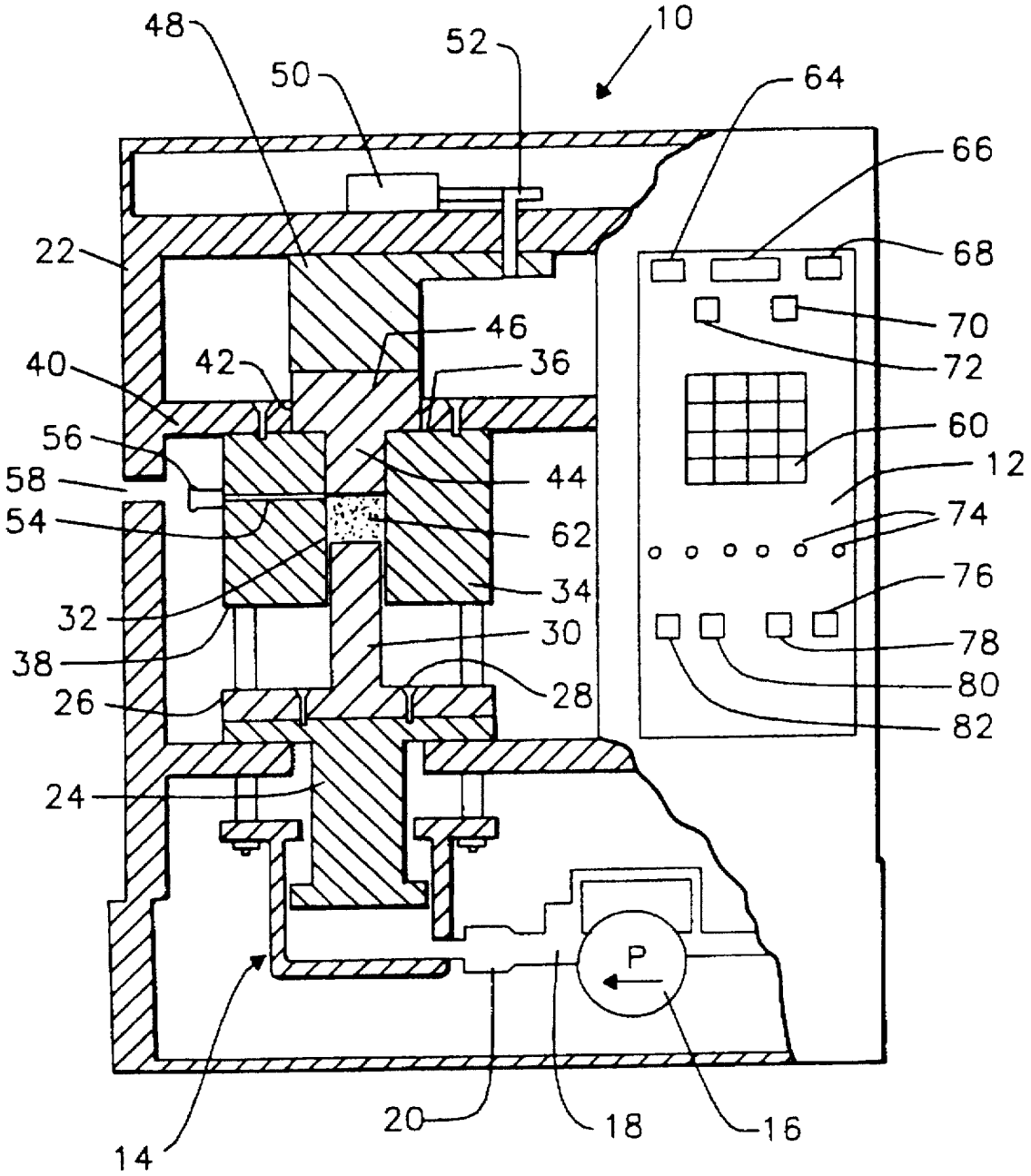
FIG. 1 is a front view of a briquette press apparatus including a control interface, constructed in accordance with one exemplary embodiment of the present invention, the briquette press device being selectively sectioned and fragmented to facilitate consideration and discussion.

Referring to FIG. 1, there is shown a briquette press apparatus 10, the operation of which is controlled through the control panel 12. The briquette press apparatus 10 includes a hydraulic press 14 driven by a pump 16. The pump 16 pumps hydraulic fluid from a reservoir (not shown) into the hydraulic press 14, past a release valve 18 and a pressure sensor 20. The pressure sensor 20 measures the pressure of the hydraulic fluid in the press 14, while the release valve 18 selectively allows hydraulic fluid to return to the reservoir. It should be understood by a person skilled in the art that the use of a hydraulic press 14 is exemplary and other well known presses utilizing an electromechanical drive, pneumatic drive or a combined pneumatic/hydraulic drive could be used.

A housing 22 supports and orients the hydraulic press 14. Within the hydraulic press 14, a piston 24 is driven by the hydraulic fluid forced into the press 14 by the pump 16. The piston 24 is removably affixed to a ram base 26 by a plurality of mechanical fasteners 28. A die ram 30 extends vertically from ram base 26 entering a die cavity 32 formed in a die base 34. The die cavity 32 transgresses the length of the die base 34 from a top surface 36 to a bottom surface 38. The die base 34 is suspended within the housing 22 by removably affixing the top surface 36 of the die base 34 to a housing cross member 40. A cap aperture 42 is formed through the cross member 40 above the die cavity 32, ensuring the die cavity 32 lay unobstructed within the housing 22.

A removable cap member 44 is positioned into the cap aperture 42, and the die cavity 32. The cap member 44 is T-shaped having an enlarged head 46 that is larger than the die cavity 32 and rests across the top of the die cavity 32 on the top surface 36 of the die base 34. The enlarged head 46 prevents the cap member 44 from falling into the die cavity 32.

A pivotable anvil member 48 abuts against the enlarged head 46 of the cap member 44. The anvil 48 is positioned either manually or by an optional servomechanism 50 which rotates the anvil 48 about a pivoting member 52. The anvil 48, when positioned above the cap member 44, is in abutment on one side with the top of the cap member 44 and on its opposing side with the housing 22. The juxtaposition of the top surface of the cap member 44, anvil 48 and housing 22 prevents any movement of the cap member out of the die cavity 32.

If a sample 62 is being compacted that has a tendency to occlude air or contains a chemical that may generate gas, the briquette press apparatus 10 may include a gas evacuation path 54 that leads from the die cavity 32. By applying a vacuum through the evacuation path 54, the sample 62 is evacuated of gas while being compressed. Obviously, since the sample 62 is entered as a powdered form, the orifices connecting the die cavity 32 with the evacuation path must be formed so as not to evacuate the powder granules, the details of which will not be addressed because the technology of evacuating powder compacting presses is well known in the art. An opening 58 is formed in the housing 22. The opening 58 is formed so that a source of vacuum may enter the housing 22 and connect with the coupling head 56 located on the outside of the die base 34. The coupling head 56 connects the vacuum source to the gas evacuation path 54.

The operational parameters of the briquette press apparatus 10 are entered and displayed on a control panel 12. A keypad 60, or another variable input device such as thumbscrews, is used to enter or recall operational parameters corresponding to varying samples 62 being placed in the die cavity 32 between the cap member 44 and the die ram 30. Various displays or indicators 64, 66, 68, 70, 72 are used to show the values chosen for pressure, dwell time, pressure release rate, force and die size, respectively. The displays or other indicators 74 are used to visualize the cycle of operation of the press apparatus 10 as it is running. Switches 76, 78, 80, 82 are used respectively to operate the Power On/Off, Start, Stop and Eject/Load functions.

Figure 2:
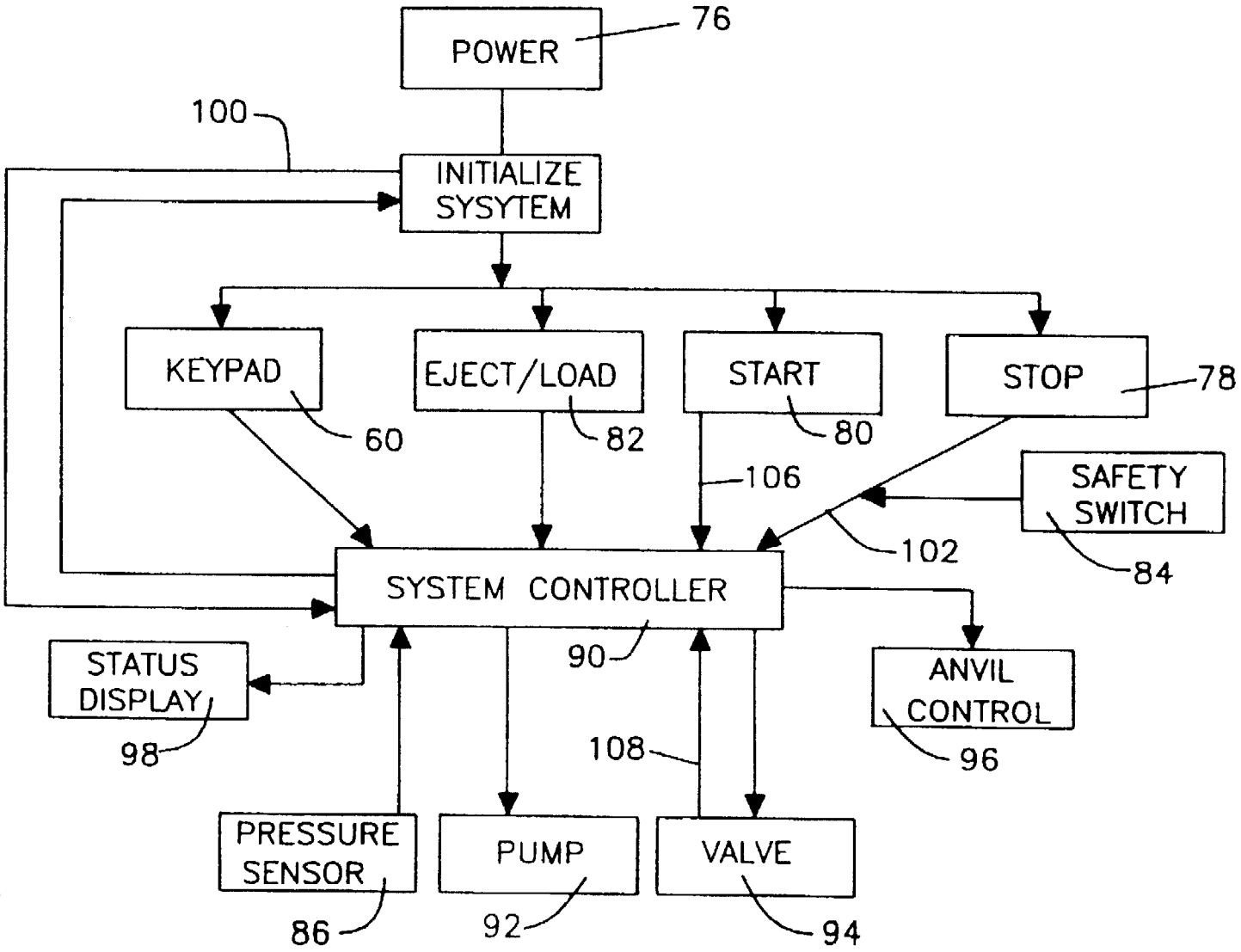
FIG. 2 is a general block diagram illustrating the formation operational modes of the briquette press apparatus shown in FIG. 1.

Referring to FIG. 2, a schematic overview of the operation of the briquette press apparatus is shown. The power switch 76 is positioned to the "On" position which initializes the system. The operator then either enters data on the keyboard 60, or engages the eject/load, start or stop switches 82, 80, 78. The actions of the operator, along with signals from safety switches 84 and the pressure sensor 86, instruct the operations of the system controller 40 that controls the functions of the pump 92, release valve 94, anvil control 96 and the status display 98.

Presses, as with other pieces of industrial equipment, are required by law to have certain safety features built into their design to assure safe operations. Such safety features, which usually include position switches, safety locks, proximity switches and the like are positioned throughout the press. Such safety features are being referred to generally as safety switches 84 and are not detailed, since the adaptation of safety devices to presses is well known in the art.

Figure 3:
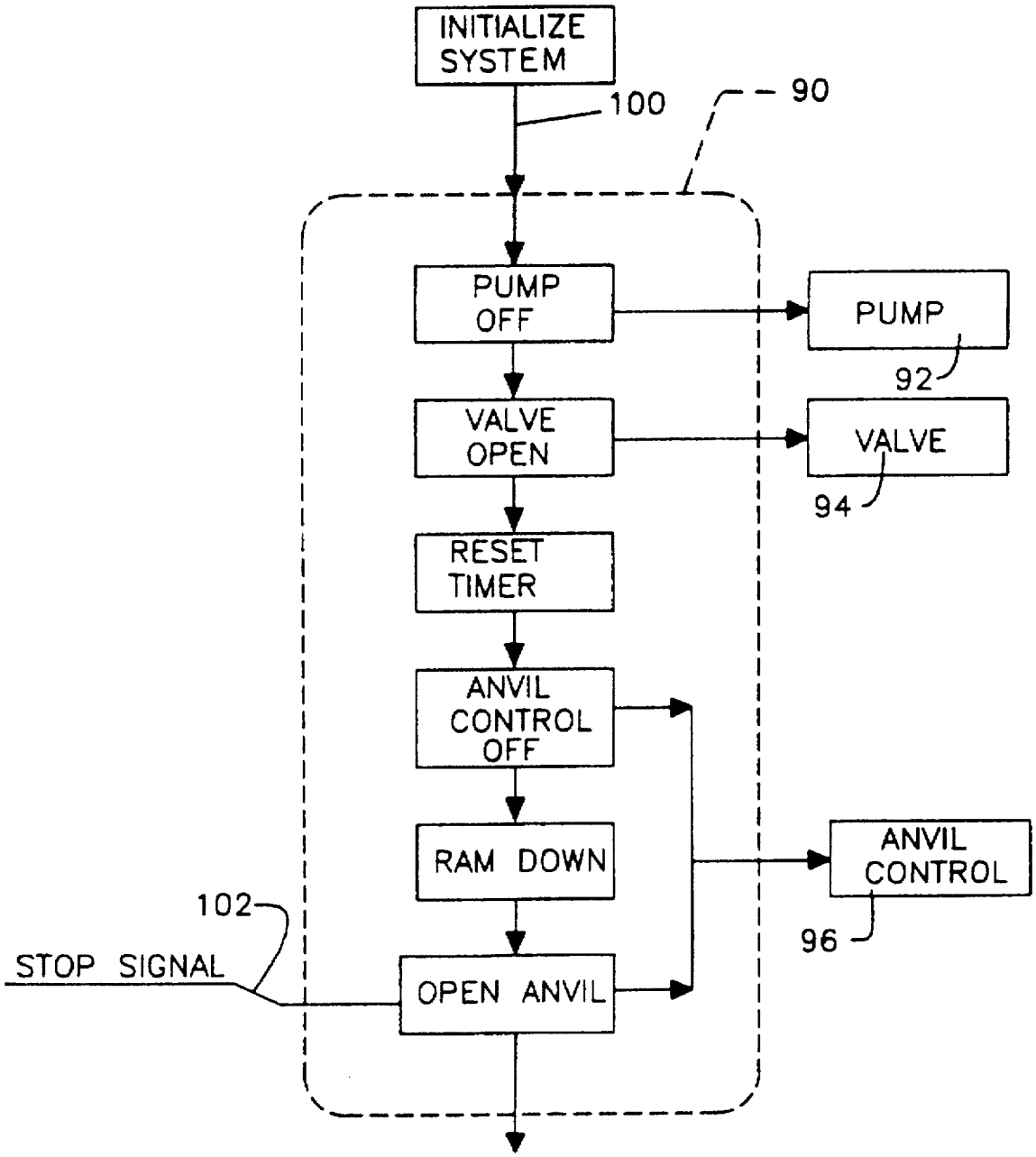
FIG. 3 is a block diagram including operational steps illustrating the initialization sequence of the briquette press apparatus.

Referring to FIGS. 3–6, the individual operations of the operating functions shown generally in FIG. 2 are detailed. As is shown in FIG. 2, the system is started by engaging the power switch 76 which provides electrical power to the individual components and acts to initialize the operating system regardless of the status of the apparatus 10 when the power switch 76 was disengaged. Referring to FIG. 3 in conjunction with FIGS. 1 and 2, the operational functions comprising the initialization of the system are shown. When the power switch 76 is engaged, the system controller 90 receives a signal 100 instructing it to deactivate the pump 92, open the relief valve 94, reset its internal timer, and deactivate the anvil control 96. When the relief valve 94 is opened, the hydraulic fluid within the hydraulic press 14 is open to the ambient pressure. Thus, the die ram 30 descends in the hydraulic press 14 under its own weight, and can be assisted by a spring return or reverse hydraulics. When the die ram 30 is fully descended, the system controller 90 actives the anvil control 96, which is servomechanism 50, and the anvil 48 is moved away from the top of the cap member 44. The anvil 48 will not be moved if a stop signal 102 is received either through the stop switch 78 from the operator or through a dangerous condition as detected by the safety switches 84. Once the anvil 48 is opened, the initialization sequence is completed and the operating process can continue.

Figure 4:
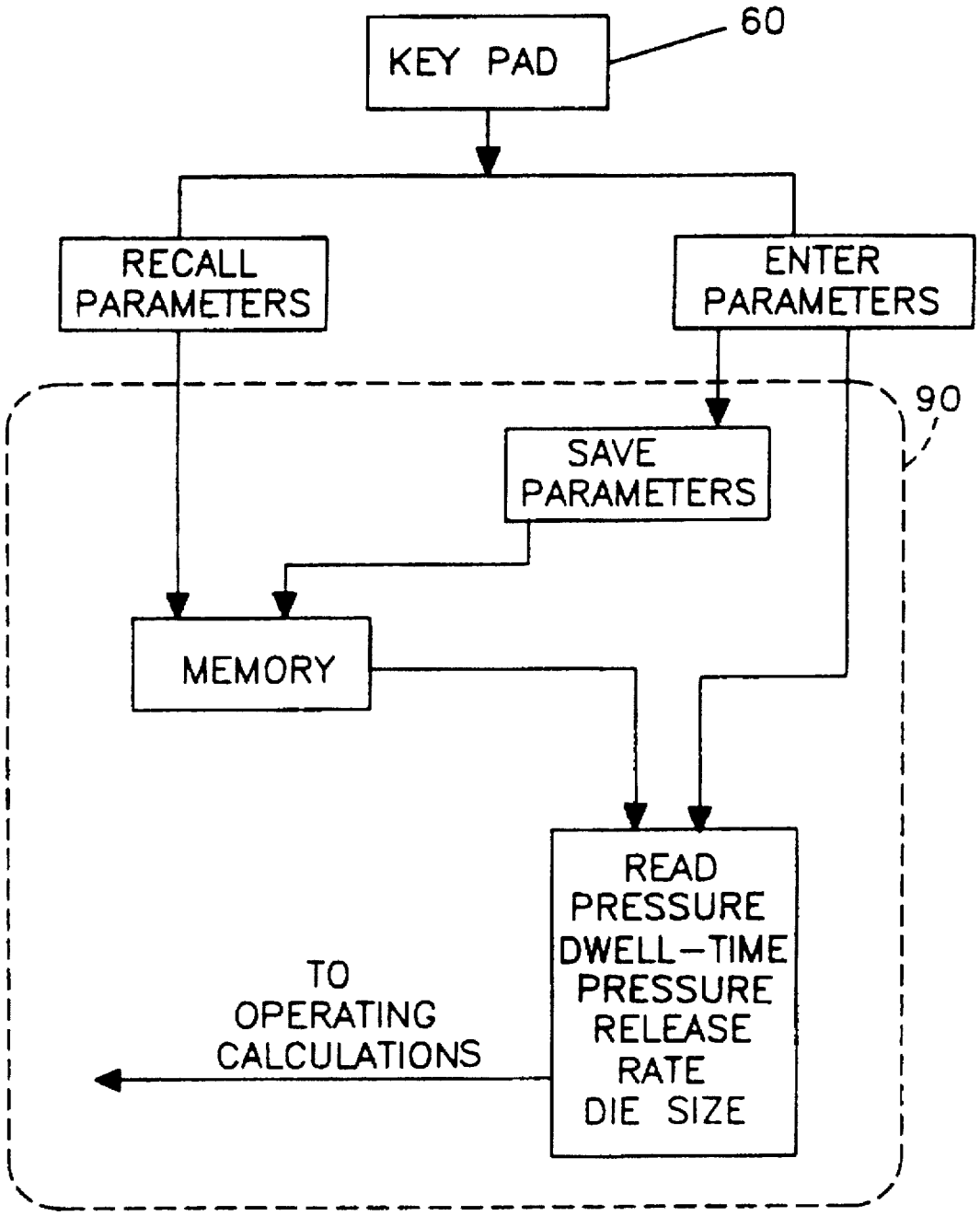
FIG. 4 is a block diagram including operational steps illustrating the use of the keypad on the briquette press apparatus.

With the initialization of the briquette press apparatus 10 complete, the operator can load a sample 62. To load a sample 62, the operator manually removes the cap member 44 from the die cavity 32. A predetermined amount of powdered sample material is then added into the die cavity 32 and the cap member 44 is replaced. The operator, knowing the size and type of sample 62 added, enters the operational parameters for that sample 62 through the keypad 60. The keypad 60 includes numerical valued keys as well as special function keys. Referring to FIG. 4, the function of the keypad 60 in regard to the briquette press apparatus 10 is shown. An operator, utilizing the keypad 60, can either enter new operation parameters or recall previously saved operational parameters from a memory source. Assuming that an operator were adding new parameters, the operator would enter into the keyboard 60 the values for the desired pressure, dwell time, pressure release rate and die size that correspond to the sample 62. The parameters are read by the system controller 90 and are used in operation calculations for the compression and decompression cycles that will be discussed later. The newly entered parameters can be saved in memory and assigned a reference number for easy retrieval. To retrieve those parameters at a later time or to retrieve previously stored parameters, the reference number is entered into the keypad 60, the appropriate parameters are then retrieved from memory and read by the system controller 90.

Figure 5:
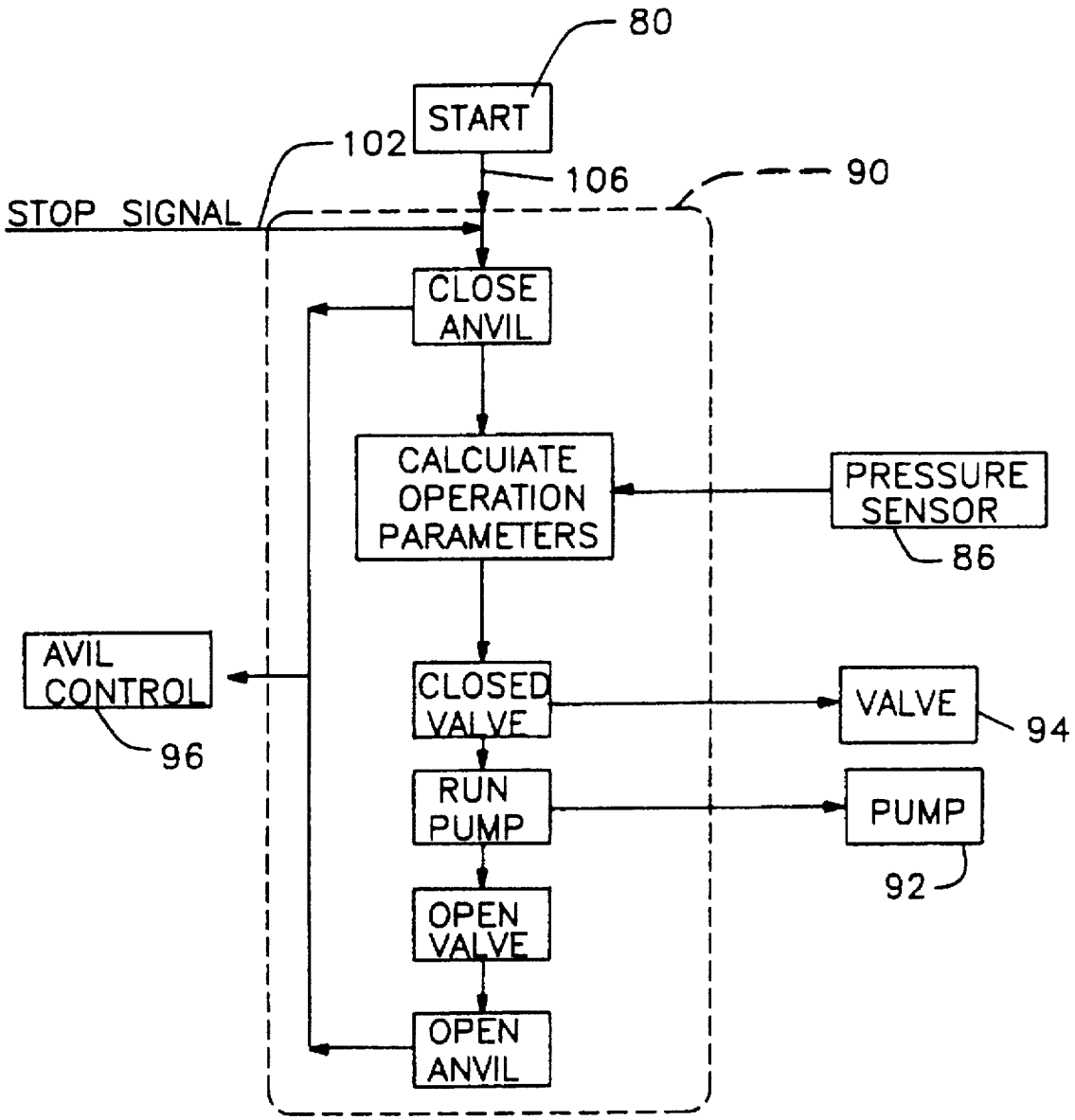
FIGS. 5 and 6 are block diagrams including flow chart depiction for illustrating the eject/load operation of the briquette press apparatus.

With the sample 62 loaded and the operating parameters chosen, the compression of the sample 62 by the briquette press apparatus 10 can be started. Referring to FIG. 5, the start button 80 is engaged which sends a signal 106 to the system controller 90. If the system controller 90 does not receive a stop signal 102 from the stop switch 78 or the safety switches 84, the compacting cycle will begin. The system controller 90 activates the anvil control 96, positioning the anvil 48 over the cap member 44. The operational parameters entered from the keyboard 60 are used in calculations to determine the desired compression pressure, the dwell time of the compression, and the decompression pressure rate. These calculated values are compared with an internal timer and the actual pressure of the hydraulic press 14, as measured by the pressure sensor 86, continuously during this compression cycle. With the control parameters calculated, the release valve 94 is closed and the pump 92 is activated. Hydraulic fluid drawn by the pump 92 drives the piston 24 upward. Consequently, the die ram 30 is driven upward into the die cavity 32. The sample 62 rests upon the face of the die ram 30. As the die ram 30 advances, the sample 62 is compressed between the die ram 30 and the cap member 44. The die ram 30 is advanced until the sample 62 is subject to a predetermined pressure. The system controller 90 controls the pump 92 and the release valve 94 continuously during the compression stroke to maintain the predetermined pressure. The predetermined pressure is maintained for the desired dwell time.

When the compression dwell time has expired, the decompression cycle begins. The system controller 90 reads the pressure being applied to the sample 62 from the pressure sensor 20. The measured value is referenced with the internal timer of the system controller 90 and the actual release rate is calculated. The system controller 90 then compares the actual rate with a desired reference rate. The system controller 90 controls the release valve 94 and pump 92, to maintain the actual rate with the desired rate of decompression. When the pressure of the compared sample reaches ambient, the anvil control 96 is activated and the anvil 48 is moved away from the top of the cap member 44.

Figure 6:
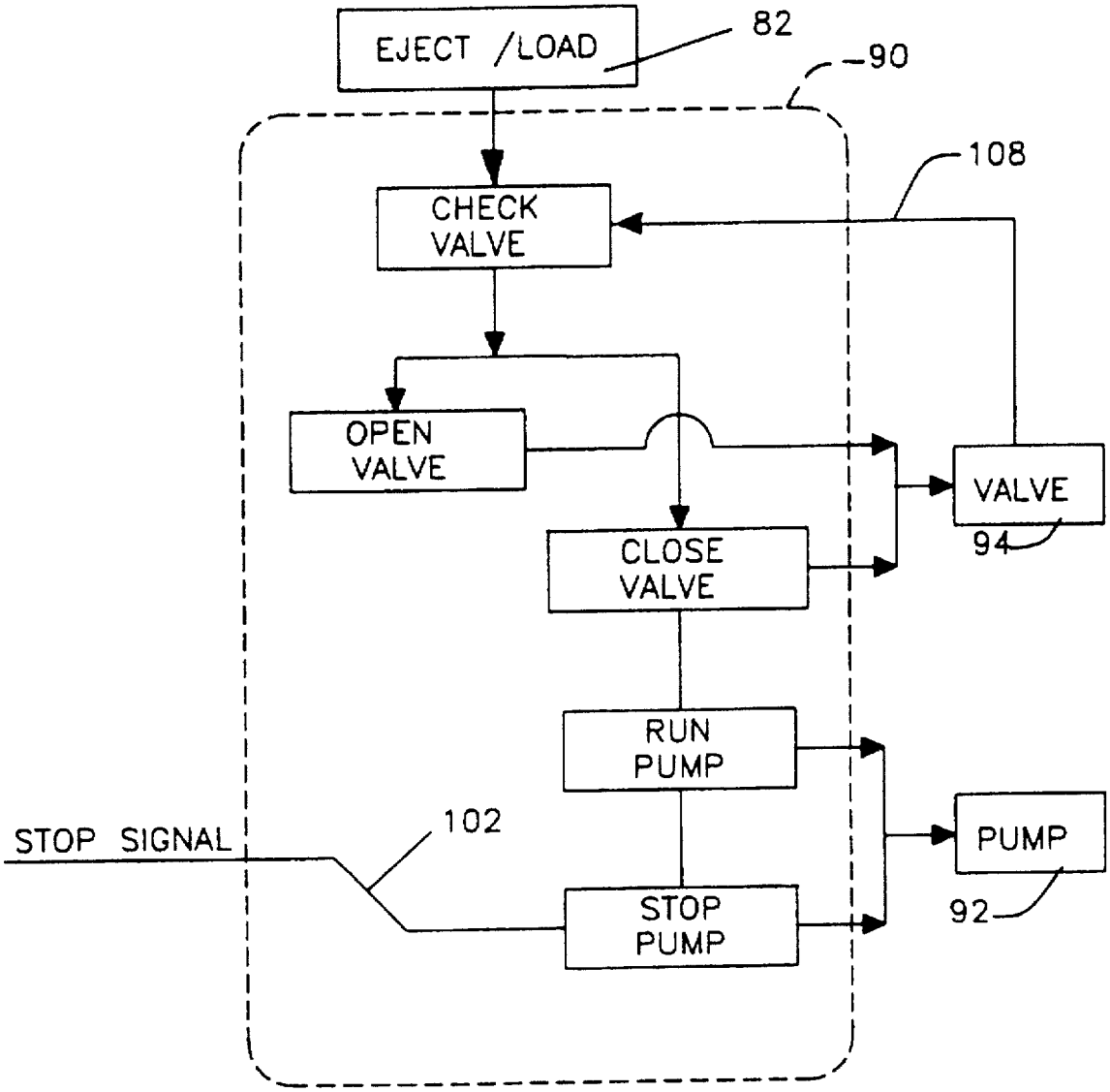

To unload the sample 62 from the die cavity 32, the eject/load switch 82 is engaged and the cap member 44 is manually removed. Referring to FIG. 6, it can be seen that when the eject/load switch 82 is engaged, a status signal 108 is read by the system controller 90 from the release valve 94. The status signal 108 informs the system controller 90 as to whether the release valve 94 is open or closed. A status signal 108 indicating an open release valve would show that the briquette press apparatus 10 has just completed a compacting cycle, or that the system has just been turned on and has been initialized. In either scenario, the eject/load switch causes the system controller 90 to close the release valve 94 and activate the pump 92. The pump 92 causes the die ram 30 to raise in the die cavity 32, ejecting an old sample and positioning the die ram 30 so that a new sample 62 can be added.

Adversely, if the status signal 108 indicated that the release valve 94 was closed, it is assumed that an old sample 62 has been ejected from the die cavity 32 by the die ram 30 remaining in its uppermost position and a new sample 62 has been placed on top of the die ram 30. In such a scenario, the release valve 94 will open and the die ram 30 will descend to its bottommost position resulting with the new sample 62 being lowered into the die cavity 32. Now the start button 80 could be engaged and the compression/decompression cycle will be initiated.

Referring back to FIGS. 1 and 2, it is shown that the operational parameters and cycle status of the briquette press apparatus 10 are displayed on the control panel 12. The systems controller 90 reads the desired pressure, dwell time, pressure release rate, and force and die size from the keypad 60. The values read are then indicated on displays 64, 66, 68, 70, 72, respectively. The system controller 90 also activates individual displays 74 that show the status of the operational cycle for the briquette press apparatus 10. The visual display of the operational cycle enables a user to continuously monitor operations and, in the event of malfunction, troubleshoot immediately with a minimum of down time.

Certain types of samples 62 are characterized with tendencies to occlude gas or contain constituents that may generate gas. The initial presence of voids inbetween sample particles behave as collection areas for gasses or air. Under briquetting pressure, these collection areas compress, entrapping any air or gas. Upon release of the applied pressure or during analysis in a vacuum spectrometer, the occluded gas or air may effuse, abruptly expand or even mildly explode, resulting in damage to the sample surface. To eliminate this occurrence, air or gas is evacuated from the die cavity 32 during the compression and decompression operations. The die base 34 includes an evacuation path 54 that enters the die cavity 32. On the outside of the die base 34 a vacuum connection coupler 56 is present. An orifice 58 is formed in the housing 22, allowing a vacuum source to connect to coupler 56.

It should be understood that the embodiment described herein is merely exemplary and that a person skilled in the art may make variations and modifications without departing from the spirit and scope of the invention. All such variations and modifications are intended to be included within the scope of the invention as defined by the appended claims.

We claim:

1. A briquette press apparatus having a compression stroke wherein a ram advances against, and compacts, a sample of powdered material and a decompression stroke wherein said ram is withdrawn from said sample, said apparatus comprising:

*an input device for selecting a predetermined ram size, pressure, dwell time and decompression rate, wherein said predetermined ram size corresponds to the size of the ram selected for the briquette press for use on the sample;*

*sensor means for sensing the pressure being applied to said ram;* a variably programmable control means for controlling said compression stroke and said decompression stroke, [such that] *wherein said control means reads said ram size from said input device and the pressure from the pressure sensing means and determines an actual pressure being applied to said ram; and said control means* during said compression stroke [the] *compares said actual* pressure *to said predetermined pressure and regulates* said ram [applies] to [said sample is maintained at a programmed] *maintain said actual* pressure [for a programmed] *at said predetermined pressure for said* dwell time, and during said decompression stroke[.] *said control means determines the rate of decompression from said actual pressure, compares* the rate of decompression [is maintained at a programmed] *with said predetermined decompression rate and regulates said ram to maintain the rate of decompression at said* decompression rate.

[2. The apparatus of claim 1, wherein said programmable control means includes a pressure sensing means for measuring the pressure applied by said ram to said sample during said compression stroke and said decompression stroke.]

3. The apparatus of claim [2] *1*, wherein said programmable control means includes a programmable memory wherein [desired] values for pressure, dwell time, decompression rate and the size of the ram can be stored [or] *and* recalled *by said input device.*

4. The apparatus of claim 3, wherein said briquette press apparatus further includes [a plurality of] numerical display means, said numerical display means displaying the values entered into, or recalled from, said programmable memory.

5. The apparatus of claim 4, wherein said briquette press apparatus further includes [a plurality of] cycle display means, wherein said cycle display means indicates to an operator the status of operations of said briquette press apparatus.

[6. The apparatus of claim 3, wherein said programmable control means and said programmable memory are accessed through a variable input device.]

7. The apparatus of claim [2] *1*, wherein said ram is advanced against said sample, during said compression stroke by a hydraulic press means.

8. The apparatus of claim 7, wherein said ram is withdraw from said sample during said decompression stroke by a release valve means, coupled to said hydraulic press means, for venting hydraulic pressure.

9. The apparatus of claim 5, further including anvil means, wherein said ram is advanced against said sample in a die cavity, said sample being compressed within said die cavity between said ram and said anvil means.

10. The apparatus of claim 9, wherein said anvil means includes a removable cap member that contacts said sample within said die cavity and a positionable anvil member that can be placed in abutment with said cap member, preventing its removal from said die cavity.

11. The apparatus of claim 10, wherein said anvil member is automated, having its position controlled by said programmable control means, wherein said anvil member is automatically positioned above said cap member prior to the initiation of said compression stroke and automatically retreats from said cap member at the conclusion of said decompression stroke.

12. The apparatus of claim [2] *1*, further including a gas evacuation means for evacuating gas from said sample during said compression stroke.

13. The apparatus of claim 4, further including an ejecting means for selectively ejecting said sample from said apparatus.

14. A briquette forming method in which a sample of powered material is compressed into a briquette, said method including the steps of:

1) placing said sample into a pressing means;
2) compressing said sample, measuring the actual pressure being applied to said sample;
3) comparing said actual pressure measured with a desired reference pressure;
4) regulating said pressing means so as to conform said actual pressure with said desired reference pressure for a predetermined dwell time;
5) decompressing said sample in said pressing means, measuring the actual rate of decompression for said pressing means;
6) comparing said actual rate of decompression with a desired reference decompression rate; and
7) regulating said pressing means so as to conform said actual rate of decompression with said desired reference decompression rate.

15. The method of claim 14, wherein steps 2 through 7 are automatically performed by a variable programmable control means.

16. The method of claim 15, wherein said reference pressure, dwell time and reference decompression rate for a given said sample are stored within said programmable control means.

17. The method of claim 16, further including the step of retrieving said reference pressure, dwell time and reference decompression rate from said programmable control means as needed.

18. The method of claim 17, further including the step of evacuating said sample of gas while said sample is being compressed.

19. The method of claim 18, further including the step of venting said powdered material to ambient air while said powder material is being decompressed.

20. The method of claim 16, further including the step of opening said pressing means after step 7, allowing said sample to be removed.

* * * * *